(12) United States Patent
Haynie et al.

(10) Patent No.: US 10,084,646 B2
(45) Date of Patent: *Sep. 25, 2018

(54) UPGRADING A DESCRIPTOR ENGINE FOR A NETWORK INTERFACE CARD

(71) Applicant: INTERNATIONAL BUSINESS MACHINES CORPORATION, Armonk, NY (US)

(72) Inventors: Howard M. Haynie, Wappingers Falls, NY (US); Donald Jung, Hopewell Junction, NY (US); Jeffrey M. Turner, Poughkeepsie, NY (US); Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,267

(22) Filed: Feb. 14, 2017

(65) Prior Publication Data

US 2018/0091363 A1 Mar. 29, 2018

Related U.S. Application Data

(63) Continuation of application No. 15/274,300, filed on Sep. 23, 2016, now Pat. No. 9,648,137.

(51) Int. Cl.
*G06F 15/177* (2006.01)
*H04L 12/24* (2006.01)
*H04L 29/08* (2006.01)

(52) U.S. Cl.
CPC .......... *H04L 41/082* (2013.01); *H04L 67/303* (2013.01)

(58) Field of Classification Search
CPC ... H04L 67/34; H04L 41/0853; H04L 41/082; H04L 67/303; G06F 15/7871; G06F 8/65; G06F 8/665
See application file for complete search history.

(56) References Cited

U.S. PATENT DOCUMENTS 8,028,282 B2 * 9/2011 Brannock ............... G06F 8/665
717/169
9,164,775 B2 * 10/2015 Shutt ..................... G06F 9/4416
(Continued)

OTHER PUBLICATIONS

Howard M. Haynie, et al.,"Upgrading a Descriptor Engine for a Network Interface Card", U.S. Appl. No. 15/274,300, filed Feb. 16, 2017.

(Continued)

*Primary Examiner* — Mohamed A Wasel
(74) *Attorney, Agent, or Firm* — Cantor Colburn LLP; Steven Chiu (57) ABSTRACT

A method for updating a descriptor engine for a network interface card (NIC) may include quiescing a transmit stream to the NIC. The method may further include stopping a descriptor engine from providing new receive descriptors to the NIC. The method may further include creating a copy in a memory of any receive descriptors already available to the NIC prior to the stopping the descriptor engine. The method may further include setting a controller to redirect inbound traffic to the memory. The method may further include restoring a transmit configuration and a transmit state of the descriptor engine subsequent to updating the descriptor engine.

20 Claims, 4 Drawing Sheets

(56) References Cited

U.S. PATENT DOCUMENTS

| | | | |
|---|---|---|---|
| 2012/0311112 A1* | 12/2012 | Bender | G06F 8/665 |
| | | | 709/221 |
| 2016/0188313 A1* | 6/2016 | Dubal | G06F 8/654 |
| | | | 717/172 |
| 2016/0267774 A1* | 9/2016 | Janardhanan | G08B 25/008 |

OTHER PUBLICATIONS

List of IBM Patents or Patent Applications Treated as Related; Date Filed: Feb. 16, 2017, pp. 1-2.

* cited by examiner

UPGRADING A DESCRIPTOR ENGINE FOR A NETWORK INTERFACE CARD

DOMESTIC PRIORITY

This application is a continuation of U.S. patent application Ser. No. 15/274,300, entitled "UPGRADING A DESCRIPTOR ENGINE FOR A NETWORK INTERFACE CARD," filed Sep. 23, 2016, now issued as U.S. Pat. No. 9,648,137, the disclosure of which is incorporated by reference herein in its entirety.

BACKGROUND

The present disclosure relates generally to network interface cards and, more particularly, to upgrading a descriptor engine for a network interface card without cooperation by the network interface card.

Circular first-in-first-out (FIFO) buffers called descriptor rings are used in network interface cards (NICs) from various manufacturers. A controller may include an interface to communicate with the off-the-shelf third-party NICs, such as by peripheral component interconnect express. The controller can be any combination of hardware or software.

SUMMARY

According to examples of the present disclosure, techniques including methods, systems, and/or computer program products for upgrading a descriptor engine for a network interface card (NIC) are provided. An example method may include: quiescing, by a processing device, a transmit stream to the NIC; stopping, by the processing device, a descriptor engine from providing new receive descriptors to the NIC; creating, by the processing device, a copy in a memory of any receive descriptors already available to the NIC prior to the stopping the descriptor engine; setting, by the processing device, a controller to redirect inbound traffic to the memory; logging, by the processing device, a current configuration, state, and receive pointers of the descriptor engine; updating, by the processing device, the descriptor engine; restoring, by the processing device, a transmit configuration and a transmit state of the descriptor engine; and enabling, by the processing device, a transmit stream of a data router such that transmit packets are created by the descriptor engine for transmission by the NIC.

An example system for upgrading a descriptor engine for a network interface card (NIC) may include a memory having computer readable instructions and a processing device for executing the computer readable instructions. The computer readable instructions may include: quiescing, by the processing device, a transmit stream to the NIC; stopping, by the processing device, a descriptor engine from providing new receive descriptors to the NIC; creating, by the processing device, a copy in a memory of any receive descriptors already available to the NIC prior to the stopping the descriptor engine; setting, by the processing device, a controller to redirect inbound traffic to the memory; logging, by the processing device, a current configuration, state, and receive pointers of the descriptor engine; updating, by the processing device, the descriptor engine; restoring, by the processing device, a transmit configuration and a transmit state of the descriptor engine; and enabling, by the processing device, a transmit stream of a data router such that transmit packets are created by the descriptor engine for transmission by the NIC.

An example computer program product for upgrading a descriptor engine for a network interface card (NIC) may include a computer readable storage medium having program instructions embodied therewith, the program instructions executable by a processing device to cause the processing device to perform a method. The method may include: quiescing, by the processing device, a transmit stream to the NIC; stopping, by the processing device, a descriptor engine from providing new receive descriptors to the NIC; creating, by the processing device, a copy in a memory of any receive descriptors already available to the NIC prior to the stopping the descriptor engine; setting, by the processing device, a controller to redirect inbound traffic to the memory; logging, by the processing device, a current configuration, state, and receive pointers of the descriptor engine; updating, by the processing device, the descriptor engine; restoring, by the processing device, a transmit configuration and a transmit state of the descriptor engine; and enabling, by the processing device, a transmit stream of a data router such that transmit packets are created by the descriptor engine for transmission by the NIC.

The example system, method, and/or computer program product provide herein provide the advantage of enabling a descriptor engine to be upgraded for a NIC without cooperation of the NIC and/or NIC manufacturer.

In addition, various embodiments of the present disclosure may include reprogramming hardware of the descriptor engine or applying a hotfix to the descriptor engine. In other embodiments, when the controller redirects inbound traffic, inbound requests to the descriptor engine are paused, inbound requests are rerouted to the memory, and then inbound traffic is resumed through the controller by storing the inbound traffic to the memory. These additional features further provide the advantage of enabling a descriptor engine to be upgraded.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

A descriptor engine manages descriptors rings. Various implementations are described below by referring to several examples of upgrading a descriptor engine for a network interface card (NIC). The upgrading may be performed without cooperation by the NIC. A transmit stream from a data router is halted, a descriptor engine is stopped from providing new receive descriptors to the NIC, a copy of existing receive descriptors is stored in a memory, and a controller then redirects inbound traffic to the memory. While the controller redirects inbound traffic to the memory, the descriptor engine 104 may be taken down and provided with an update. The descriptor engine's configuration and state may be restored from the memory and the data router is restored.

Example embodiments of the disclosure include or yield various technical features, technical effects, and/or improvements to technology. Example embodiments of the disclosure provide techniques to upgrade a descriptor engine for a NIC without the cooperation of the NIC. This reduces the need for cooperation from vendors of the NIC and reduces the thread to reset or power-cycle a processing system during/after the updating. These aspects of the disclosure constitute technical features that yield the technical effect of updating the descriptor engine without cooperation by the NIC. As a result of these technical features and technical effects, the present techniques represent an improvement to existing descriptor engine and descriptor rings. It should be appreciated that the above examples of technical features, technical effects, and improvements to technology of example embodiments of the disclosure are merely illustrative and not exhaustive.

Figure 1:
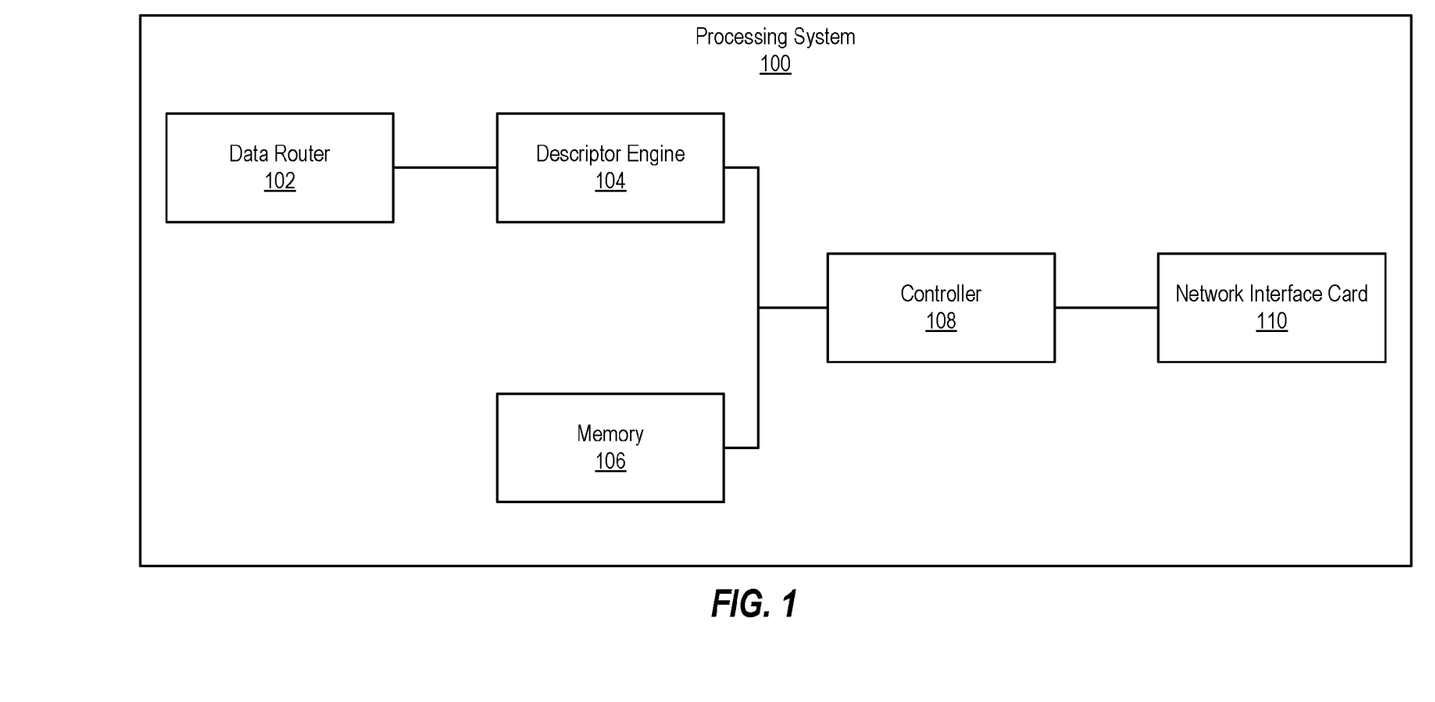
FIG. 1 illustrates a block diagram of a processing system for upgrading a descriptor engine for a network interface card (NIC) according to examples of the present disclosure.

FIG. 1 illustrates a block diagram of a processing system for upgrading a descriptor engine for a network interface card (NIC) according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by a processing device implement the engines described herein. Other engines may also be utilized to include other features and functionality described in other examples herein.

Processing system 100 may include a data router 102, a descriptor engine 104, a memory 106, a controller 108, and a network interface card (NIC) 110. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The data router 102 transmits and receives data to and from the NIC 110. The descriptor engine 104 generates descriptors and adds the descriptors to the data received from the data router 102. The descriptors provide empty memory space for inbound packets.

The memory 106 stores inbound requests using address translation in the controller 108 from the descriptor engine's 104 memory-mapped space to equivalent space in the memory 106. In examples, the memory 106 is a random access memory, although other types of memory may be implemented.

The controller 108 redirects inbound traffic from the NIC 110 to the memory 106 instead of the descriptor engine 104. This enables the descriptor engine 104 to be updated (e.g., a hotfix can be applied to the descriptor engine 104).

Figure 2:
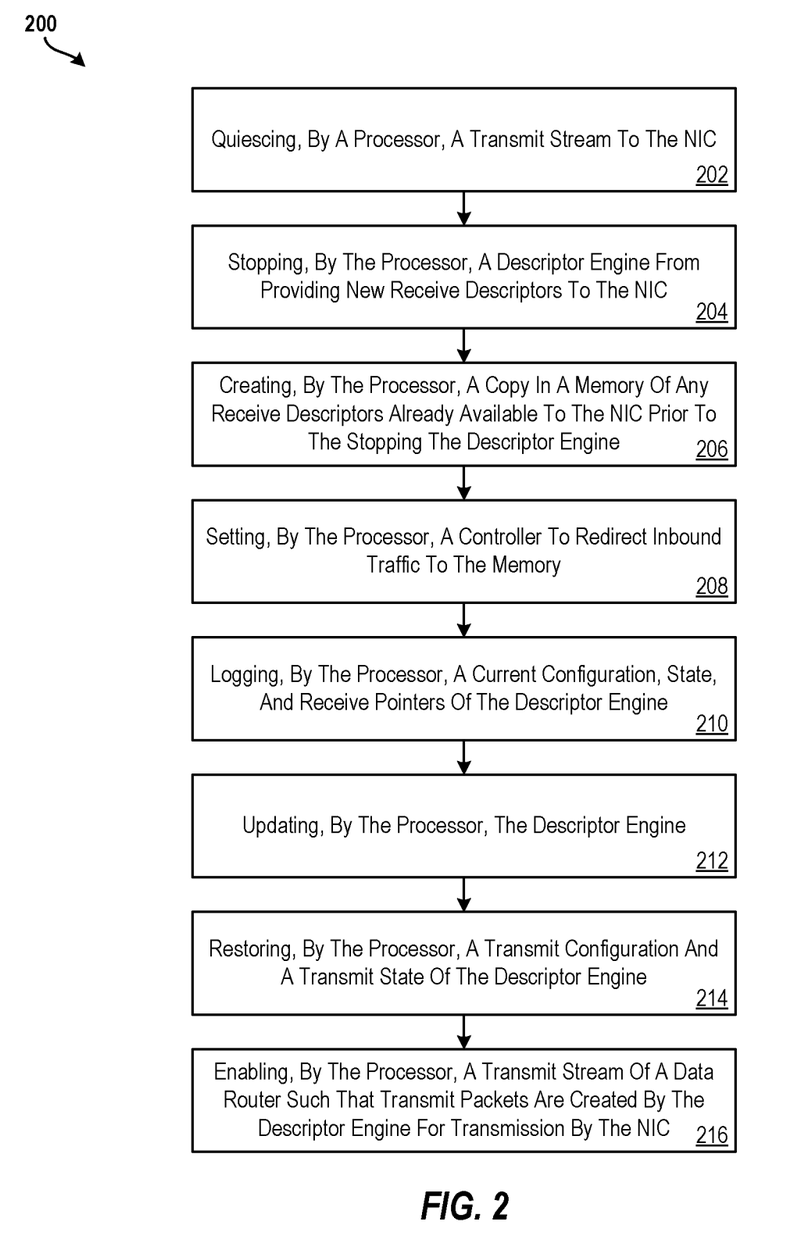
FIG. 2 illustrates a flow diagram of a method for upgrading a descriptor engine for a network interface card (NIC) according to examples of the present disclosure.

FIG. 2 illustrates a flow diagram of a method 200 for upgrading a descriptor engine for a network interface card (NIC) according to aspects of the present disclosure. It should be appreciated that the method 200 may be performed by a processing system, such as the processing system 100 of FIG. 1, the processing system 20 of FIG. 4, or by another suitable processing system. FIG. 2 is described with reference to the elements of the processing system 100 of FIG. 1 but should not be considered as so limited.

At block 202, the method 200 includes quiescing, by a processor, a transmit stream to the NIC. The quiescing acts to disable (or pause, to be resumed later) the data router's 102 ability to route transmission traffic. Accordingly, the descriptor engine 104 is temporarily relieved of producing new transmission descriptions for the NIC 110. In examples, the method 200 includes waiting for the NIC 110 to consume the transmission descriptions already produced, at which point the method 200 continues to block 204.

At block 204, the method 200 includes stopping, by the processor, a descriptor engine from providing new receive descriptors to the NIC. The receive descriptors provide empty memory space for inbound packets.

At block 206, the method 200 includes creating, by the processor, a copy in a memory of any receive descriptors already available to the NIC prior to the stopping the descriptor engine. The NIC 110 fetch requests can be redirected to the RAM 106.

At block 208, the method 200 includes setting, by the processor, a controller to redirect inbound traffic to the memory. Inbound requests (e.g., stores and fetches) to the descriptor engine 104 are paused and rerouted to the RAM 106 via address translation in the controller 108 from the descriptor engine's memory-mapped space to equivalent space in the RAM 106. Inbound traffic is resumed through the controller by storing the inbound traffic to the RAM 106.

At block 210, the method 200 includes logging, by the processor, a current configuration, state, and receive pointers of the descriptor engine. Because the descriptor engine 104 is stopped (i.e., no new events have reached the descriptor engine 104), the descriptor engine 104 is in a stable state for logging. The receive pointers can be indexes into descriptor rings.

At block 212, the method 200 includes updating, by the processor, the descriptor engine. In examples, updating the descriptor engine 104 may include applying a patch to an executable or replacing the executable (i.e., applying a hotfix). The updating may also include reprogramming hardware of the descriptor engine 104.

At block 214, the method 200 includes restoring, by the processor, a transmit configuration and a transmit state of the descriptor engine. This brings back up the transmission side of the descriptor engine 104.

At block 216, the method 200 includes enabling, by the processor, a transmit stream of a data router such that transmit packets are created by the descriptor engine for transmission by the NIC. In other words, normal transmission function is restored.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
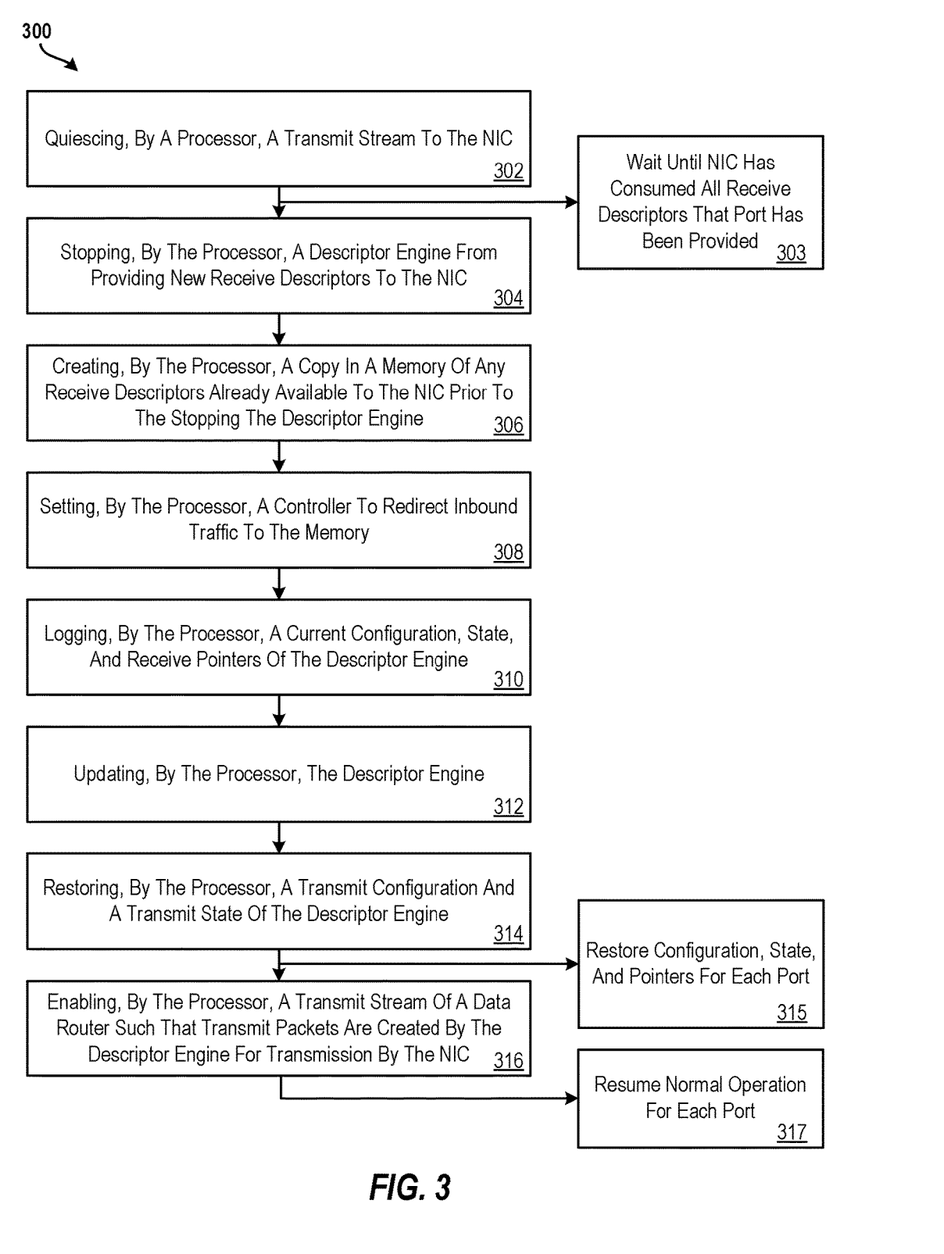
FIG. 3 illustrates a flow diagram of a method for upgrading a descriptor engine for a network interface card (NIC) according to examples of the present disclosure.

FIG. 3 illustrates a flow diagram of a method 300 for upgrading a descriptor engine for a network interface card (NIC) according to aspects of the present disclosure. It should be appreciated that the method 200 may be performed by a processing system, such as the processing system 100 of FIG. 1, the processing system 20 of FIG. 4, or by another suitable processing system. FIG. 2 is described with reference to the elements of the processing system 100 of FIG. 1 but should not be considered as so limited. It should be appreciated that the example of FIG. 3 may be utilized in a multi-port environment.

At block 302, the method 300 includes quiescing, by a processor, a transmit stream to the NIC. The quiescing acts to disable (or pause, to be resumed later) the data router's 102 ability to route transmission traffic. Accordingly, the descriptor engine 104 is temporarily relieved of producing new transmission descriptions for the NIC 110. In examples, the method 300 includes waiting for the NIC 110 to consume the transmission descriptions already produced.

For a multi-port environment, the following steps may be executed independently for each port. In particular, each port is brought back online independently once the NIC 110 reaches the quiesced state of owning no receive descriptors for that port.

At block 303, the method 300 includes waiting until the NIC 110 has consumed all receive descriptors that the port has been provided prior to stopping the descriptor engine at block 304 and that were not yet returned prior to the logging at block 310. The pointers/indexes logged in block 310 give the range of descriptors the NIC 110 is still expected to write back (those between the indexes, which would be none) then one of the following two options should be satisfied before continuing to block 303: 1) for no packet loss, the descriptor engine 104 is signaled to notify the data router 102 for each of the receive descriptor write-backs until none remain; or 2) if the descriptor engine 104 does not support option 1, the descriptor engine 104 waits for the final receive descriptor write-back to occur. The second option may mean some packet loss.

At block 304, the method 300 includes stopping, by the processor, a descriptor engine from providing new receive descriptors to the NIC. The receive descriptors provide empty memory space for inbound packets.

At block 306, the method 300 includes creating, by the processor, a copy in a memory of any receive descriptors already available to the NIC prior to the stopping the descriptor engine. The NIC 110 fetch requests can be redirected to the RAM 106.

At block 308, the method 300 includes setting, by the processor, a controller to redirect inbound traffic to the memory. Inbound requests (e.g., stores and fetches) to the descriptor engine 104 are paused and rerouted to the RAM 106 via address translation in the controller 108 from the descriptor engine's memory-mapped space to equivalent space in the RAM 106. Inbound traffic is resumed through the controller by storing the inbound traffic to the RAM 106.

At block 310, the method 300 includes logging, by the processor, a current configuration, state, and receive pointers of the descriptor engine. Because the descriptor engine 104 is stopped (i.e., no new events have reached the descriptor engine 104), the descriptor engine 104 is in a stable state for logging. The receive pointers can be indexes into descriptor rings.

At block 312, the method 300 includes updating, by the processor, the descriptor engine. In examples, updating the descriptor engine 104 may include applying a patch to an executable or replacing the executable (i.e., applying a hotfix). The updating may also include reprogramming hardware of the descriptor engine 104.

At block 314, the method 300 includes restoring, by the processor, a transmit configuration and a transmit state of the descriptor engine. This brings back up the transmission side of the descriptor engine 104.

At block 315, the descriptor engine's 104 receive configuration, receive state, and receive pointers, as logged at block 310, are restored such that the descriptor engine 104 matches the state of the NIC 110.

At block 316, the method 300 includes enabling, by the processor, a transmit stream of a data router such that transmit packets are created by the descriptor engine for transmission by the NIC. In other words, normal transmission function is restored.

At block 317, the method 300 includes allowing the descriptor engine 104 to provide new fresh receive descriptors to the NIC again for each port such that normal receive function is restored for each port.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
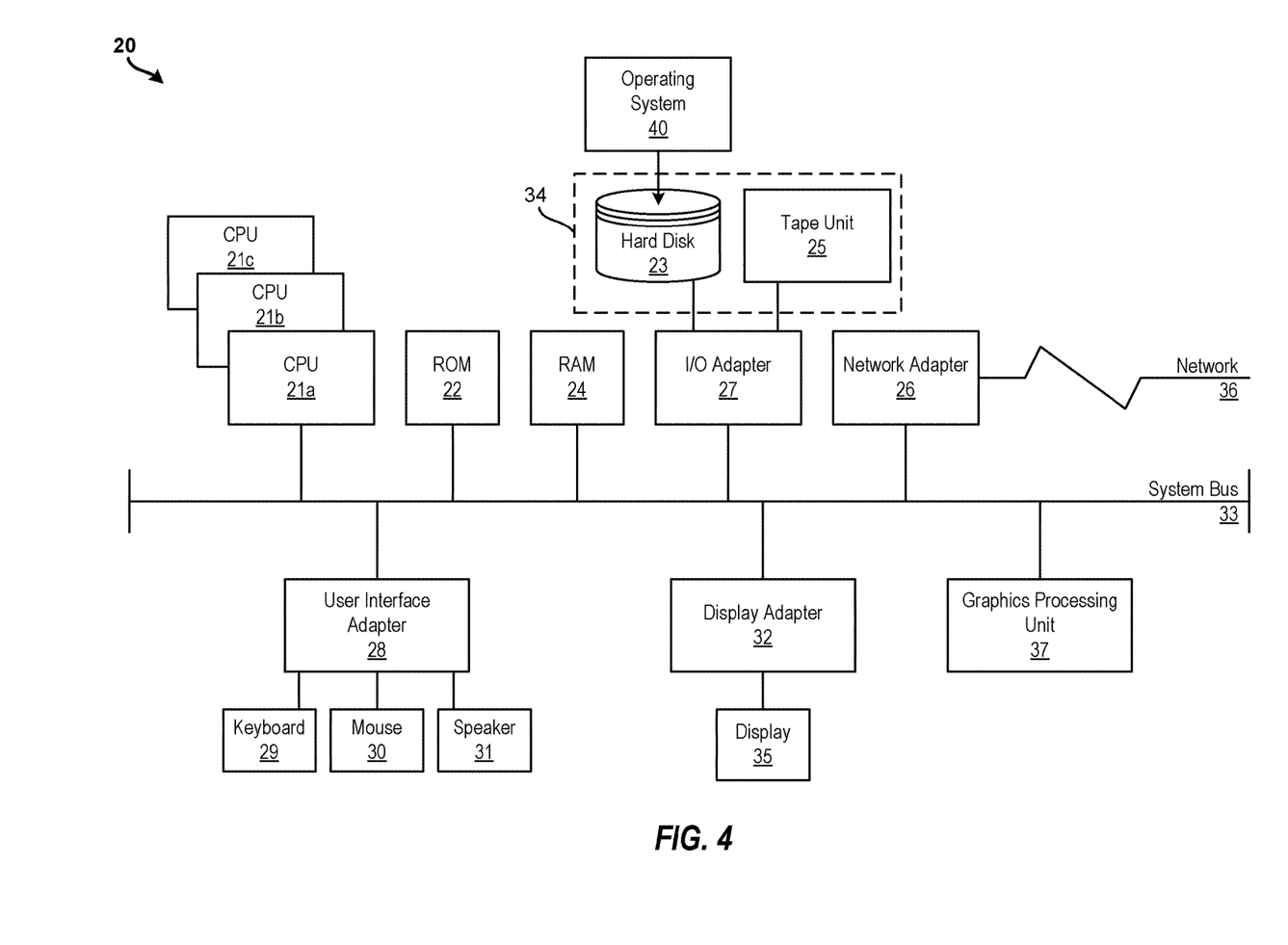
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for upgrading a descriptor engine for a network interface card (NIC), the method comprising:
   quiescing, by a processing device, a transmit stream to the NIC;
   stopping, by the processing device, a descriptor engine from providing new receive descriptors to the NIC;
   creating, by the processing device, a copy in a memory of any receive descriptors already available to the NIC prior to the stopping the descriptor engine;
   setting, by the processing device, a controller to redirect inbound traffic to the memory; and
   restoring, by the processing device, a transmit configuration and a transmit state of the descriptor engine subsequent to updating the descriptor engine.

2. The method of claim 1, wherein the updating comprises reprogramming hardware of the descriptor engine.

3. The method of claim 1, wherein the updating comprises applying a hotfix to the descriptor engine.

4. The computer-implemented method of claim 1, wherein setting the controller to redirect inbound traffic further comprises:
   pausing inbound requests to the descriptor engine;
   rerouting inbound requests to the memory; and
   resuming inbound traffic through the controller by storing the inbound traffic to the memory.

5. The computer-implemented method of claim 4, wherein the rerouting inbound requests occurs via address translation in the controller.

6. The computer-implemented method of claim 1, wherein the NIC comprises a plurality of ports.

7. The computer-implemented method of claim 6, further comprising bringing each port of the plurality of ports of the NIC back online independently subsequent to the NIC reaching a quiesced state.

8. The computer-implemented method of claim 1, further comprising, subsequent to restoring the transmit configuration and the transmit state of the descriptor engine, enabling, by the processing device, a transmit stream of a data router such that transmit packets are created by the descriptor engine for transmission by the NIC.

9. The computer-implemented method of claim 1, further comprising, prior to updating the descriptor engine, logging, by the processing device, a current configuration, state, and receive pointers of the descriptor engine.

10. A system for upgrading a descriptor engine for a network interface card (NIC), the system comprising:
    a memory having computer readable instructions; and
    a processing device for executing the computer readable instructions, the computer readable instructions comprising:
       quiescing, by the processing device, a transmit stream to the NIC;
       stopping, by the processing device, a descriptor engine from providing new receive descriptors to the NIC;
       creating, by the processing device, a copy in a memory of any receive descriptors already available to the NIC prior to the stopping the descriptor engine;
       setting, by the processing device, a controller to redirect inbound traffic to the memory; and
       restoring, by the processing device, a transmit configuration and a transmit state of the descriptor engine subsequent to updating the descriptor engine.

11. The system of claim 10, wherein the updating comprises reprogramming hardware of the descriptor engine.

12. The system of claim 10, wherein the updating comprises applying a hotfix to the descriptor engine.

13. The system of claim 10, wherein setting the controller to redirect inbound traffic further comprises:
    pausing inbound requests to the descriptor engine;
    rerouting inbound requests to the memory; and
    resuming inbound traffic through the controller by storing the inbound traffic to the memory.

14. The system of claim 13, wherein the rerouting inbound requests occurs via address translation in the controller.

15. The system of claim 10, wherein the NIC comprises a plurality of ports.

16. The system of claim 15, wherein the computer readable instructions further comprise bringing each port of the plurality of ports of the NIC back online independently subsequent to the NIC reaching a quiesced state.

17. The system of claim 10, wherein the computer readable instructions further comprise, subsequent to restoring the transmit configuration and the transmit state of the descriptor engine, enabling, by the processing device, a transmit stream of a data router such that transmit packets are created by the descriptor engine for transmission by the NIC.

18. The system of claim 10, wherein the computer readable instructions further comprise, prior to updating the descriptor engine, logging, by the processing device, a current configuration, state, and receive pointers of the descriptor engine.

19. A computer program product for upgrading a descriptor engine for a network interface card (NIC), the computer program product comprising:

a computer readable storage medium having program instructions embodied therewith, the program instructions executable by a processing device to cause the processing device to perform a method comprising:
quiescing, by the processing device, a transmit stream to the NIC;
stopping, by the processing device, a descriptor engine from providing new receive descriptors to the NIC;
creating, by the processing device, a copy in a memory of any receive descriptors already available to the NIC prior to the stopping the descriptor engine;
setting, by the processing device, a controller to redirect inbound traffic to the memory; and
restoring, by the processing device, a transmit configuration and a transmit state of the descriptor engine subsequent to updating the descriptor engine.

20. The computer program product of claim 19, wherein setting the controller to redirect inbound traffic further comprises:
pausing inbound requests to the descriptor engine;
rerouting inbound requests to the memory; and
resuming inbound traffic through the controller by storing the inbound traffic to the memory.

\* \* \* \* \*